(12) United States Patent
Garg et al.

(10) Patent No.: US 12,271,303 B2
(45) Date of Patent: Apr. 8, 2025

(54) SYSTEM AND METHOD FOR UPDATING MEMORY TABLES

(71) Applicant: QUALCOMM Incorporated, San Diego, CA (US)

(72) Inventors: Manish Garg, Hyderabad (IN); Pratibind Kumar Jha, Hyderabad (IN); Prakhar Srivastava, Lucknow (IN); Santhosh Reddy Akavaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/349,206

(22) Filed: Jul. 10, 2023

(65) Prior Publication Data
US 2025/0021478 A1 Jan. 16, 2025

(51) Int. Cl.
*G06F 12/02* (2006.01)
(52) U.S. Cl.
CPC .. *G06F 12/0292* (2013.01); *G06F 2212/1016* (2013.01); *G06F 2212/1032* (2013.01)
(58) Field of Classification Search
CPC ......... G06F 12/0292; G06F 2212/1016; G06F 2212/1032
See application file for complete search history.

(56) References Cited

U.S. PATENT DOCUMENTS

| 2019/0146926 A1* | 5/2019 | Lee | G06F 12/0292 |
| | | | 711/154 |
| 2020/0097216 A1* | 3/2020 | Marcu | G06F 3/0659 |
| 2022/0374360 A1* | 11/2022 | Liu | G06F 12/0246 |

* cited by examiner

*Primary Examiner* — Masud K Khan
(74) *Attorney, Agent, or Firm* — Muncy, Geissler, Olds & Lowe, P.C./QUALCOMM

(57) ABSTRACT

Methods that may be performed by a host controller and a memory controller of a computing device. The method synchronizes memory tables between the storage device and a host device by modifying an indicator in a first memory table on the storage device in response to a change in a memory mapping, the first memory table mapping logical addresses to physical addresses of memory on the storage device, the indicator identifying one or more address mapping changes of the first memory table, notifying the host device that the first memory table has been modified, and transmitting to the host device at least a portion of the first memory table including the one or more address mapping changes. The storage device processes memory requests from the host device based on one or more addresses affected by the one or more address mapping changes.

26 Claims, 10 Drawing Sheets

SYSTEM AND METHOD FOR UPDATING MEMORY TABLES

BACKGROUND

Developers and users of computing devices are always seeking improved operation performance. One method to improve operations of computing devices is a host performance booster (HPB) mode in which host components store and use logical-to-physical (L2P) address mapping tables for host components to access memory device components. The logical-to-physical (L2P) address mapping tables enable knowledge of whether data sought by host components is located in the memory device and whether such locations are active. Being able to quickly ascertain the existence of data and activity status of locations of the data stored in the memory device reduces input/output transaction times for accessing data by host components of the memory device, thereby improving operation performance. Due to various memory management processes on the memory device, the L2P tables change frequently and require synchronization with the host device.

SUMMARY

Various aspects include methods performed in a storage device for synchronizing memory tables between the storage device and a host device and a host controller of a computing device including modifying an indicator in a first memory table on the storage device in response to a change in memory mapping, the first memory table mapping logical addresses to physical addresses of memory on the storage device, the indicator identifying one or more address mapping changes of the first memory table.

Some aspects may further include notifying the host device that the first memory table has been modified, transmitting to the host device at least a portion of the first memory table including the one or more address mapping changes, and processing, by the storage device, a first memory request from the host device based on one or more addresses affected by the one or more address mapping changes.

In some aspects the portion of the first memory table transmitted to the host device may correspond to the one or more address mapping changes. Some aspects may further include receiving, by the storage device, a request for the one or more address mapping changes. Some aspects may further have the first memory request including a physical address updated based on the one or more address mapping changes. In some aspects the indicator may be a bit value assigned to each memory mapping in the first memory table and that the bit value is changed when the corresponding memory mapping is changed. In some aspects the indicator may be a value that indicates a position in the first memory table corresponding to an interface between a synchronized portion of the first memory table and an unsynchronized portion of the first memory table corresponding to the one or more mapping address changes.

Some aspects may further include resetting the indicator upon receipt of an acknowledgement from the host device that the portion of the first memory table has been received. Some aspects may further include transmitting a notification to the host device upon modifying the indicator in the first memory table on the storage device.

Further aspects include a computing device or flash storage device configured to perform operations corresponding to any of the methods summarized above. Further aspects include a flash storage device for use in a computing device, the flash storage device including a processor configured to perform operations of any of the methods summarized above. Further aspects include a flash storage device including a non-transitory computer readable medium with processors executable instructions configured to perform the methods summarized above. Further aspects include a computing device including a host controller configured to perform operations corresponding to any of the methods summarized above. Further aspects include a computing device including means for performing functions of any of the methods summarized above. Further aspects include a host controller for use in a computing device, the host controller including a processor configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
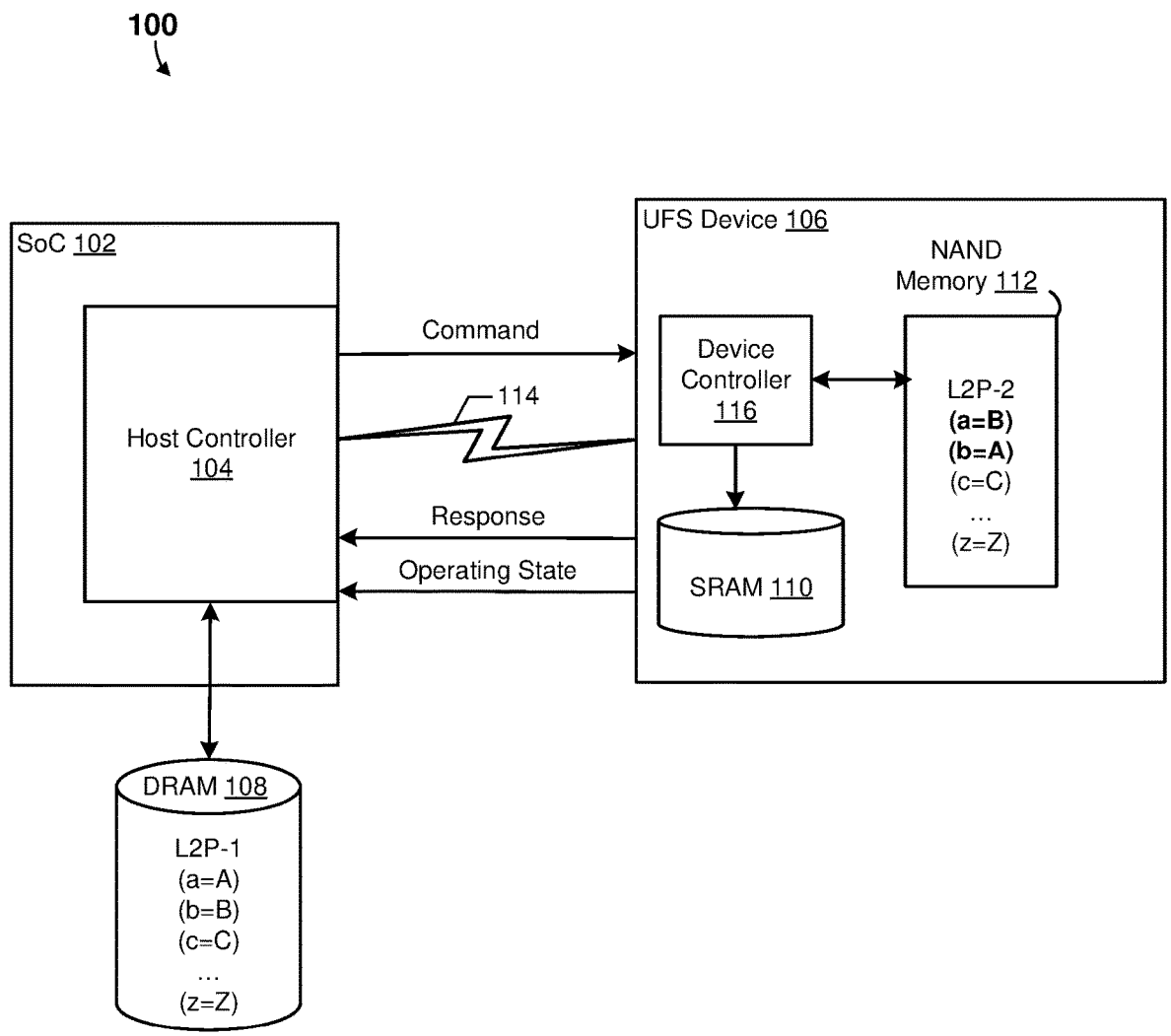
FIG. 1 is a system block diagram illustrating an example memory system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices including a host controller and a storage device that facilitate synchronization between logical-to-physical (L2P) tables. The L2P tables are stored in a dynamic random-access memory (DRAM) communicatively connected to the host controller and stored in a NAND memory of a universal flash storage (UFS) device communicatively connected to the host controller via a link. Various embodiments may determine when the L2P tables are out of synchronization and, in response, synchronize the L2P tables by exchanging an altered portion of the L2P tables.

Various embodiments include methods and computing devices including a host controller that manages host performance booster (HPB) modes based on availability of a host controller, such as a component of a system-on-a-chip (SoC), and/or availability of a memory device controller (also referred to herein as a device controller), such as a component of a universal flash storage (UFS) device. In some embodiments, different HPB modes, such as a host control mode (HCM) and/or a device control mode (DCM), may be enabled based on availability of the host controller and/or availability of the memory device controller. In some embodiments, the DCM may be enabled based on the host controller being busy and the memory device controller being available. In some embodiments, the HCM may be enabled based on the host controller being available and the memory device controller being busy. In some embodiments, the DCM may be enabled based on both the host controller and the memory device controller being busy and following the memory device controller becoming available.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

Developers and users of computing devices are always seeking improved operation performance. One means implemented in computing devices to improve operation performance is a host performance booster (HPB) mode in which a host memory, such as a dynamic random access memory (DRAM) communicably connected to a host controller of an SoC, is used as a cache for a flash transition layer (FTL). The FTL maintains a logical-to-physical (L2P) address mapping table in flash memory of an UFS device connected to the host controller. The L2P address mapping table enables knowledge of whether data sought by host components is located at the flash memory and whether such locations are active. The HPB mode enables the host memory to maintain an L2P address mapping table, which may correspond to at least part of the L2P address mapping table in the flash memory. L2P address mapping table entries of the host memory can be read by the host controller and physical addresses from the L2P address mapping table entries stored in the host memory may be used to execute memory access transactions for the flash memory located at the UFS device faster than executing memory access transactions using logical addresses for the flash memory located on the UFS device, which requires the UFS device to translate the logical addresses to physical addresses. Improving the speed of memory access transactions may improve operation performance.

Various embodiments include methods and computing devices including a host controller that manage host performance booster (HPB) modes based on availability of a host controller, such as a component of a system-on-a-chip (SoC), and/or availability of a memory device controller (also referred to herein as a device controller), such as a component of a universal flash storage (UFS) device. In some embodiments, different HPB modes, such as a host control mode (HCM) and/or a device control mode (DCM), may be enabled based on availability of the host controller and/or availability of the memory device controller. In some embodiments, the DCM may be enabled based on the host controller being busy and the memory device controller being available. In some embodiments, the HCM may be enabled based on the host controller being available and the memory device controller being busy.

The L2P address mapping table of the host memory may need to be updated prior to use to ensure that the L2P address mapping tables of the host memory and of the flash memory are synchronized. Under different circumstances, the HPB mode may be set to HCM or DCM. When the HPB mode is set to HCM, the host controller may identify which subregions of the L2P address mapping table of the host memory are active and/or inactive. When the HPB mode is set to DCM, the memory device controller may identify which subregions of the L2P address mapping table of the flash memory are active and/or inactive and notify the host controller to update the L2P address mapping table of the host memory. The performance improvements realized by the HPB mode can be negatively affected when the L2P table of the host device is not updated or requires long update periods.

For example, in conventional L2P table synchronization between a UFS device and a host device requires copying an entire group of L2P table entries where one or more changes have been made in the group. The group is marked "dirty" until synchronized. This method of synchronization decreases use of the L2P table since large sections are often marked unusable requiring look up of the physical address on the storage device. Further, the synchronization of large chunks of the L2P table to address individual changes can result in large, unnecessary data transfers for synchronization that slows down the operation of both devices. As the storage device implements more memory management mechanisms such as garbage collection, defragmentation, and wear leveling, the overhead introduced by these conventional synchronization techniques becomes excessive.

Various embodiments address and overcome the foregoing problems of L2P address mapping table synchronization performance degradation by providing an indicator for each mapping entry in the L2P table on the storage device side of the system that identifies a synchronization status of that mapping entry. A synchronization process may then only transfer the changed or updated L2P table entries and, thus, save on overhead associated with conventional L2P address mapping table synchronization processes. Various embodiments may include notifying the host device that the first memory table has been modified, transmitting to the host device at least a portion of the first memory table including the one or more address mapping changes, and processing, of the storage device, a first memory request from the host device based on one or more addresses affected by the one or more address mapping changes.

The host controller/device may receive a notification indicating that one or more entries in the L2P table of the host device are out-of-sync and require update. This notification may be an exception transmitted in response to a read request of data at a synchronized or unsynchronized logical address. The host controller may request the updated entries from the L2P table of the storage device and may receive a response with those unsynchronized entries of the L2P table from the storage device. The host controller may then update the local L2P table with these entries. The host controller may then send an acknowledgement to the storage device that the L2P table has been synchronized.

This solution may include an indicator in the L2P table of the storage device indicating one or more memory mappings that are not synchronized with the host controller and may include a notification (or exception) issued to the host controller when a read request is received and the L2P table it not synchronized. This solution may include a host controller that issues a request for a L2P table update after receiving the notification that the local L2P table is not up to date and may include a host controller configured to update a portion of its L2P table with one or more memory mappings received from the storage device.

FIG. 1 is a system block diagram illustrating an example system suitable for implementing any of the various embodiments. The system 100 may include one or more computing devices or processors for performing L2P table synchronization. For example, the system 100 may include an SoC 102 including a host controller 104, a DRAM 108 communicably connected to the host controller 104, and a UFS device 106 communicably connected to the host controller 104 via a link 114. The host controller 104 may include a processor (not shown separately) configured to perform operations of the host controller described herein. The host controller 104 may maintain and access stored L2P mapped entries (i.e., data) of an L2P-1 address mapping table. In some embodiments, the L2P mapped entries of the L2P-1 address mapping table may be stored in the DRAM 108 or an SRAM (not shown) integral to the SoC 102, and/or the host controller 104. The UFS device 106 may include a device controller 116, a static random access memory (SRAM) 110, and a NAND memory 112. The device controller 116 may be coupled to the SRAM 110 and the NAND memory 112, such that the device controller 116 may transfer L2P mapped entries (i.e., data) of an L2P-2 address mapping table on the device controller between the NAND memory 112 and the SRAM 110.

The host controller 104 may receive read commands from other components of the SoC 102 and/or from components communicably connected to the SoC 102 (e.g., via I/O of the SoC). When HPB is enabled, in response to the read commands, the host controller 104 may check an operating state, such as available or busy, for the host controller 104 and for the device controller 116. The operating state for each of the host controller 104 and the device controller 116 may depend on operations pending for and/or being executed by the respective controller 104, 116. Criteria for different operating states for each of the host controller 104 and the device controller 116 may vary between different implementations.

The host controller 104 may enable DCM for the HPB mode in response to the host controller 104 having an operating state of busy and the device controller 116 having an operating state of available. Enabling DCM may trigger the device controller 116 to determine portions of the L2P-2 address mapping table to be synchronized with the L2P-1 address mapping table of the host controller 104. The host controller 104 may enable HCM for the HPB mode in response to the host controller 104 having an operating state of available and the device controller 116 having an operating state of busy. Enabling HCM may trigger the host controller 104 to determine portions of the L2P-1 address mapping table to be synchronized with the L2P-2 table.

If the L2P tables (e.g., L2P-1 of the DRAM 108 and L2P-2 of the NAND memory 112) are synchronized, the host controller 104 may read the data requested by the read command from the DRAM 108, and the DRAM 108 may provide the host controller 104 with the requested data. If the L2P tables (e.g., L2P-1 and L2P-2) are not synchronized, the host controller 104 may read the data requested by the read command from the UFS device 106 in a DCM or HCM such that the host controller 104 requests the unsynchronized L2P map entries of the L2P-1 table. Further description of processes that may be performed when the L2P tables are not synchronized is provided with respect to FIG. 4.

After receiving a read request, the storage device may notify the host controller 104 that one or more L2P table entries have been updated and should be synchronized. The host controller 104 may transmit a DCM/HCM-based read command to the device controller 116, and the device controller 116 may retrieve the requested L2P map entry or entries from either the NAND memory 112 or the SRAM 110. The device controller 116 may then transmit a read response message to the host controller 104 for further processing. Such further processing may include transmitting the L2P map entry or entries that were received from the device controller 116 to the source device that generated the original read request, and/or updating the L2P-1 table of the DRAM 108 with the L2P-2 map entry or entries received from the device controller 116.

Figure 2:
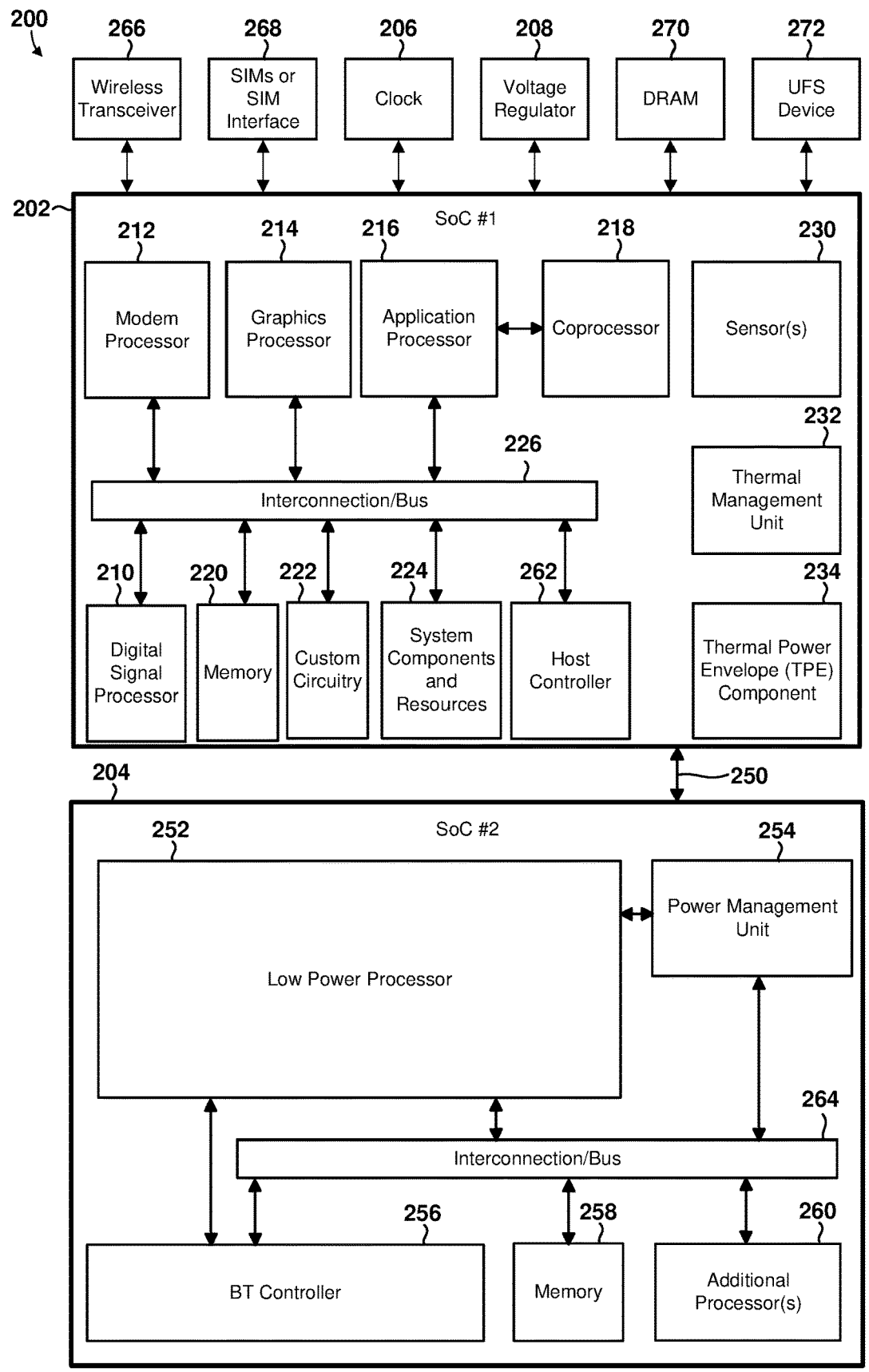
FIG. 2 is a component block diagram illustrating an example computing device suitable for implementing any of the various embodiments.

FIG. 2 is a component block diagram illustrating an example computing device 200 suitable for implementing any of the various embodiments. Various embodiments may be implemented on a number of single processor and multiprocessor computer systems, including a system-on-chip (SoC) or system in a package.

With reference to FIGS. 1 and 2, the illustrated example computing device 200 (which may be a system-in-a-package in some embodiments) includes a two SoCs 202, 204 (e.g., SoC 102) coupled to a clock 206, a voltage regulator 208, at least one subscriber identity module (SIM) 268 and/or a SIM interface, a DRAM 270 (e.g., DRAM 108) having a stored L2P address mapping table (e.g., L2P-1), a UFS device 272 (e.g., UFS device 106) having a stored L2P address mapping table (e.g., L2P-2), a wireless transceiver 266 configured to send and receive wireless communications via an antenna (not shown) to/from wireless computing devices, such as a base station, wireless device, and/or computing device (e.g., system 100). In some embodiments, the first SoC 202 may operate as central processing unit (CPU) of the computing device 200 that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, a host controller 262 (e.g., host controller 104), an interconnection/bus module 226, one or more sensors 230 (e.g., accelerometer, temperature sensor, pressure sensor, optical sensor, infrared sensor, analog sound sensor, etc.), a thermal management unit 232, and a thermal power envelope (TPE) component 234. The second SoC 204 may include a low power processor 252, a power management unit 254, an interconnection/bus module 264, a BT controller 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SoC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SoC 202, 204 may communicate via interconnection/bus module 250. In some embodiments, the interconnection/bus module may be a connection established by transceiving (i.e., receiving and transmitting) components within both the SoC 202 and SoC 204. For example, the low power processor 252 may include a universal asynchronous receiver-transmitter (UART) and the application processor 216 may include a multiple signal messages (MSM) UART driver that is communicatively connected to the UART of the low power processor 252.

The various processors 210, 212, 214, 216, 218, may be interconnected to one or more memory elements 220, system components and resources 224, and custom circuitry 222, and a thermal management unit 232 via an interconnection/bus module 226. Similarly, the low power processor 252 may be interconnected to the power management unit 254, the BT controller 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 202, 204 may further include an input/output module (not illustrated) for communicating with resources external to the SoC, such as a clock 206, a voltage regulator 208, one or more wireless transceivers 266, and at least one SIM 268 and/or SIM interface (i.e., an interface for receiving one or more SIM cards). Resources external to the SoC (e.g., clock 206, voltage regulator 208) may be shared by two or more of the internal SoC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example computing device 200 discussed above, various embodiments may be implemented in a wide variety of computing systems, which may include a single processor, multiple processors, multicore processors, or any combination thereof.

In some embodiments, the various processors of the SoC 202 and SoC 204 may be located within a same SoC. For example, the application processor 216 and low power processor 252 may be located within a same SoC, such as in a single SoC of a wearable device, to perform L2P table synchronization functions.

Figure 3:
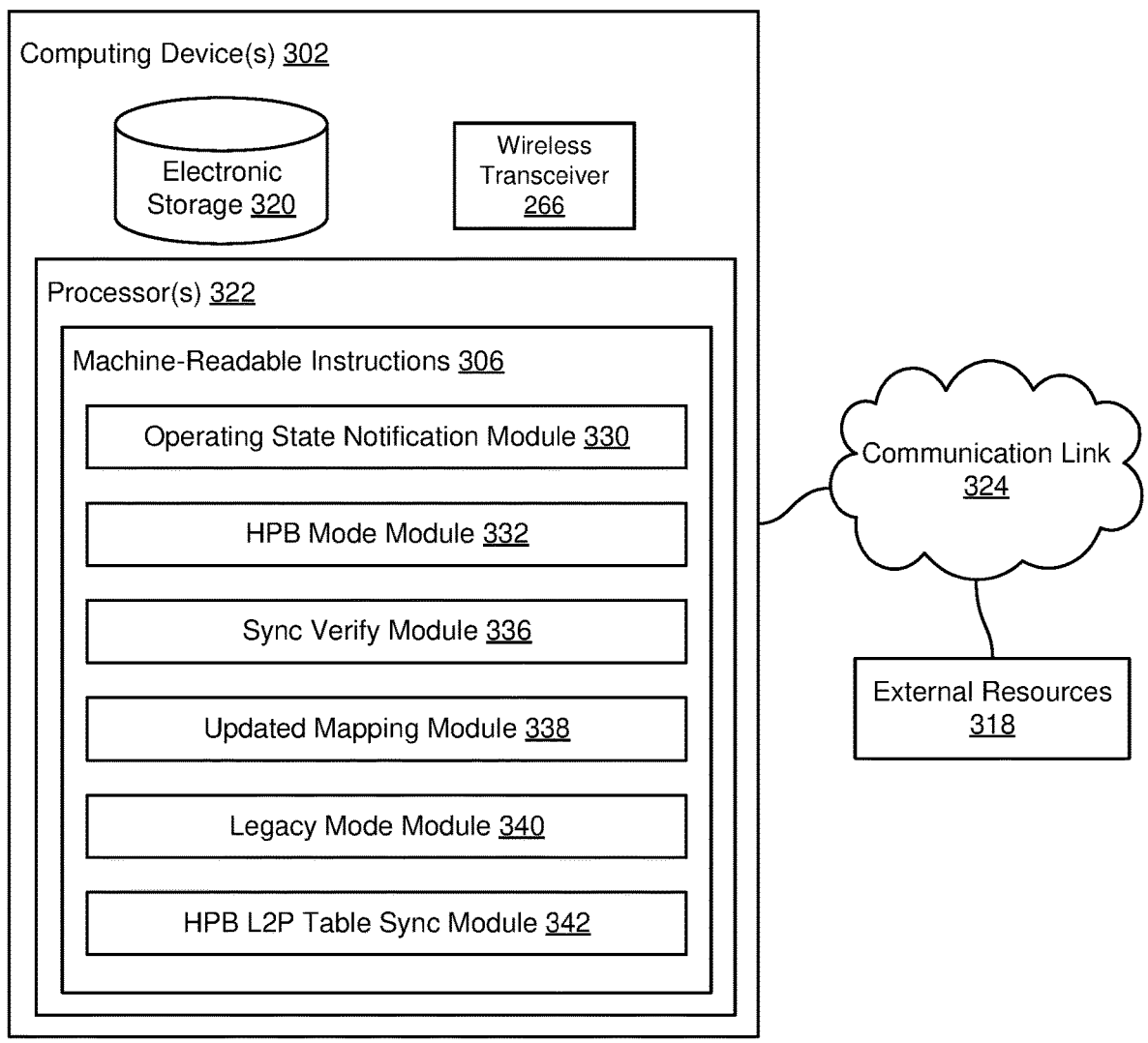
FIG. 3 is a component block diagram illustrating an example system configured for host performance booster (HPB) mode management according to some embodiments.

FIG. 3 is a component block diagram illustrating an example system 300 configured to manage synchronization of L2P tables according to some embodiments. With reference to FIGS. 1-3, the system 300 may include one or more computing device(s) 302 (e.g., system 100, computing device 200) and external resources 318, which may communicate via a communication link 324 (e.g., link 114). External resources 318 may include sources of information outside of the system 300, external entities participating with the system 300, or other resources. For example, external resources 318 may be a computing device that may transmit read requests to the computing device(s) 302. In some implementations, some or all of the functionality attributed herein to external resources 318 may be provided by resources included in the system 300. The system 300 may include a plurality of hardware, software, and/or firmware components operating together to provide the functionality attributed herein to the processor 322 (e.g., host controller 104, 262).

The computing device(s) 302 may include electronic storage 320 that may be configured to store information related to functions implemented by an operating state notification module 330, an HPB mode module 332, a sync verify module 336, an updated mapping module 338, a legacy mode module 340, an HPB L2P table sync module 342, and any other instruction modules.

The electronic storage 320 may include non-transitory storage media that electronically stores information. The electronic storage 320 may include one or both of system storage that is provided integrally (i.e., substantially non-removable) with the system 300 and/or removable storage that is removably connectable to the system 300 via, for example, a port (e.g., a universal serial bus (USB) port, a firewire port, etc.) or a drive (e.g., a disk drive, etc.).

In various embodiments, electronic storage 320 (e.g., DRAM 106, SRAM 110) may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The electronic storage 320 may include one or more virtual storage resources (e.g., cloud storage, a virtual private network, and/or other virtual storage resources). The electronic storage 320 may store software algorithms, information determined by processor(s) 322, and/or other information that enables the system 300 to function as described herein. The electronic storage 320 may store one or more L2P address mapping table (e.g., L2P-1, L2P-2).

The computing device(s) 302 may be configured by machine-readable instructions 306. Machine-readable instructions 306 may include one or more instruction modules. The instruction modules may include computer program modules. The instruction modules may include one or more of the operating state notification module 330, the HPB mode module 332, the sync verify module 336, the updated mapping module 338, the legacy mode module 340, the HPB L2P address mapping table sync module 342, and other instruction modules (not illustrated). The computing device(s) 302 may include processor(s) 322 configured to implement the machine-readable instructions 306 and corresponding modules.

The processor(s) 322 may include one of more local processors that may be configured to provide information processing capabilities in the system 300. As such, the processor(s) 322 may include one or more of a digital processor, an analog processor, a digital circuit designed to process information, an analog circuit designed to process information, a state machine, and/or other mechanisms for electronically processing information. Although the processor(s) 322 is shown in FIG. 3 as a single entity, this is for illustrative purposes only. In some embodiments, the processor(s) 322 may include a plurality of processing units. These processing units may be physically located within the same device, or the processor(s) 322 may represent processing functionality of a plurality of devices distributed in the system 300.

In some embodiments, the processor(s) 322 executing the operating status notification module 330 may be configured to generate notifications regarding one or more operating states of a host controller (e.g., host controller 104, 262) and/or a device controller (e.g., device controller 116). In some embodiments, the operating state of a host controller and/or the device controller may include a synchronization state that describes whether one or more portions of the L2P tables on the host controller (e.g., host controller 104, 262) and/or a device controller (e.g., device controller 116) are unsynchronized. The operating status notification module 330 may generate a notification (e.g., a memory exception) upon a specific trigger (e.g., a read request) and/or the notification may be generated based on a check or comparison.

The operating state may include a busy or available status which may be obtained by determining a metric for pending and/or executing operations, such as a number of the operations, a duration of execution for the operations, etc., and comparing the metric to a threshold for determining the operating state for the respective controller. In some embodiments, the operating state of the host controller and/or the memory device controller may be obtained by receiving and interpreting a signal from of the host controller and/or the memory device controller configured to indicate the operating state.

In some embodiments, the processor(s) 322 executing the HPB mode module 332 may enable HCM and/or DCM as the HPB mode in response to the operating state of the host controller and/or the memory device controller. For example, the processor(s) 322 executing the HPB mode module 332 may enable DCM for the HPB mode in response to the host controller having an operating state of busy and the device controller having an operating state of available. The processor(s) 322 executing the HPB mode module 332 may enable HCM for the HPB mode in response to the host controller having an operating state of available and the device controller having an operating state of busy. In addition, the HPB mode module 332 may determine whether the host controller and/or the memory device controller supports synchronization of a portion of a L2P table the corresponds to updated memory entries. The HPB mode module 332 may determine a host controller is enabled for this synchronization mode by checking for an exception or notification from a memory device controller. If such an exception is not received in a predefined time period, then the HPB mode module 332 may switch to a legacy mode. Likewise, the HPB mode module 332 may determine if host performance booster (HPB) mode is enabled on the host controller and/or the memory device controller, and may switch to a legacy mode if HPB mode is not enabled.

In some embodiments, the processor(s) 322 executing the sync verify module 336 may be configured to determine whether an L2P address mapping table stored at a DRAM communicatively connected to the host controller has been synchronized with an L2P address mapping table stored on NAND memory (e.g., 112) of a UFS device communicatively connected to the host controller via a link (e.g., link 114). As described above, the operating state notification module 330 may determine if an L2P table on the host controller and/or the memory device controller requires updating or is out-of-sync. After the synchronization, the sync verify module 336 may confirm or acknowledge a synchronization of one or more memory mapping entries in the L2P tables. The sync verify module 336 may be configured on the memory device controller to reset one or more indicators corresponding to memory mapping entries that have been synchronized. The sync verify module 336 may be configured on the memory device controller to reset the one or more indicators corresponding to memory mapping entries as soon as the updated entries are sent to the host controller and may record the package of updated mapping entries in case the transmission to the host controller fails.

In some embodiments, the processor(s) 322 executing the updated mapping module 338 may be configured to manage the recording of memory mappings that require synchronization and memory mappings that have been updated. For example, the memory device controller may update one or more memory mappings while a L2P table synchronization is in progress and may change one or more mappings of logical to physical addresses before the indicators for the mappings being synchronized are reset. The updated mapping module 338 may coordinate with the sync verify module 336 and may monitor/control one or more memory operations (e.g., garbage collection) while synchronization is in progress. The updated mapping module 338 may be configured to manage updates in memory mappings occurring in SRAM, NAND, and a write boost buffer of a memory device (e.g., UFS device 106).

In some embodiments, the processor(s) 322 executing the legacy mode module 340 may be configured to perform legacy mode L2P address mapping table synchronization operations. The legacy mode module 340 may be configured to operate when HPB mode or the synchronization capabilities described herein are not enabled on a device connected to the host controller and/or the memory device controller. The operations of the legacy mode are described further in FIG. 5 and FIG. 6A.

In some embodiments, the processor(s) 322 executing the HPB L2P address table sync module 342 may be configured to perform L2P address mapping table synchronization in an HCM or DCM. The HPB L2P address table sync module 342 may be configured to connect to one or more input and output (I/O) functionalities of the host controller and/or the memory device controller to transmit and receive the updated memory mappings and manage other I/O functions (e.g., read requests and responses) to coordinate with the synchronization.

The description of the functionality provided by the different modules 330-342 is for illustrative purposes, and is not intended to be limiting, as any of modules 330-342 may provide more or less functionality than is described. For example, one or more of modules 330-342 may be eliminated, and some or all of its functionality may be provided by other ones of modules 330-342. As another example, processor(s) 322 may execute one or more additional modules that may perform some or all of the functionality attributed below to one of modules 330-342.

In some embodiments, the operating state notification module 330, the HPB mode module 332, the sync verify module 336, the updated mapping module 338, the legacy mode module 340, the HPB L2P address table sync module 342, may be implemented by a host controller (e.g., host controller 104, 262) of the computing device(s) 302, which may be and/or may include processor 322.

Figure 4:
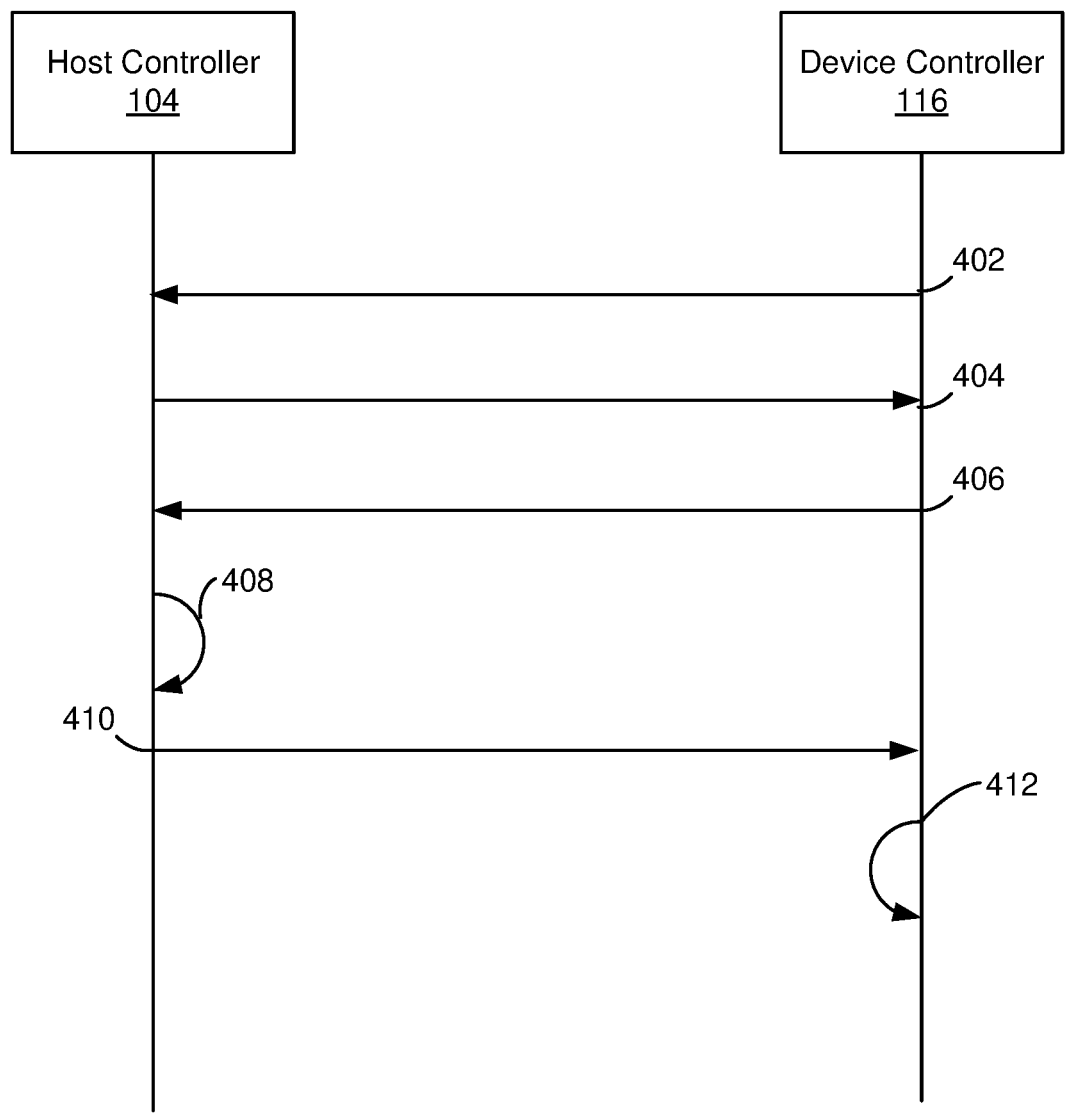
FIG. 4 is a component block and signaling diagram illustrating an example of HPB mode management for host control mode according to some embodiments.

FIG. 4 is a component block and signaling diagrams illustrating an example for synchronizing L2P tables according to some embodiments. With reference to FIGS. 1-4, a host controller 104 (e.g., host controller 262, processor 322) of an SoC (e.g., SoC 102, 202) may be communicably connected to a device controller 116 of a UFS device (e.g., UFS device 106) via a link (e.g., link 114). The host controller 104 and the device controller 116 may each be configured to execute computer code to implement computing operations. The host controller 104 and the device controller 116 may each be configured to send and receive signals, which may include computing data and/or computing instructions, between components of a computing device (e.g., system 100, computing device 200), including between each other, via the link 114.

With reference to FIG. 4, in operation 402 the device controller 116 may transmit, to the host controller 104, a notification that the L2P table of the device controller 116 has been updated. The notification may include a memory exception and may be performed in response to a read request from the host controller 104. The notification may include a memory interrupt or an I/O interrupt to inform the host controller 104 that memory mappings stored in its memory may not be accurate. The notification, exception, or interrupt may be transmitted in response to a read request where the logical address or the logical-to-physical mapping in the read request is incorrect due to changes in the L2P table of the UFS device 106. The notification, exception, or interrupt may be transmitted in response to a set bit or other indicator in the L2P table being modified that identifies that at least one logical-to-physical mapping in the L2P table has been updated.

In operation 404, the host controller 104 may transmit, and the memory device controller 116 may receive, a request for the updated entries to synchronize the L2P tables. The request for the updated memory mapping entries may be transmitted in the form of a UFS Protocol Information Unit (UPIU). The request for the updated memory mapping entries from the host controller 104 may be sent in response to the notification/interrupt of operation 402. The request for the updated memory mapping entries of operation 404 may be a command (e.g., HPB_UPDATE_MNT command).

In operation 406, the device controller 116 may transmit, and the host controller 104 may receive, a set of one or more memory mappings that may be listed in 8-byte entries or rows that map logical-to-physical addresses (e.g., a=B). A leading byte may indicate how many active L2P entries are being updated in the transmitted update. The set of one or more memory mappings or mapping entries from the L2P table that is transmitted may be ordered in sequence of update time or ordered for sequential insertion in the L2P table of the host controller or ordered in any other manner or not ordered. The set of one or more memory mappings may be copied from a top (first rows) of the L2P table of the UFS device.

In operation 408, the host controller 104 reads the received set of one or more memory mappings and incorporates them into the local L2P table to update it with the received set of entries/mappings. The L2P address mapping table stored in the DRAM 108 may be synchronized by the host controller 104 by finding each logical or physical address in the L2P table corresponding to an updated entry and replacing that entry/mapping in the L2P table of the host controller 104. The L2P address mapping table of the host controller 104 may be updated by other data merge methods. The host controller 104 may process the received set of one or more memory mappings before inserting the received memory mappings into the local L2P table. The received set of one or more memory mappings may be inserted individually into the local L2P table of the host controller 104.

In operation 410, the host controller 104 may transmit, and the device controller 116 may receive, an acknowledgement that the L2P table update was successful. In some embodiments, the acknowledgement may include a summary or listing of the logical addresses that were updated in the local L2P table of the host controller 104. The device controller 116 (or sync verify module 336) may confirm the listing or record the L2P tables as synchronized (e.g., change a synchronization status or operating state).

In operation 412, the memory device controller 116 may reset one or more indicators corresponding to the updated memory mappings. In some embodiments, in operation 412, the memory device controller 116 may re-sort the L2P table of the memory device controller 116 such that the updated memory mappings are inserted into their ordered positions in the L2P table. The memory device controller 116 may then be prepared to fulfill read requests from the host controller 104 based on logical addresses stored in the L2P table of the host controller 104, including the updated addresses.

Figure 5:
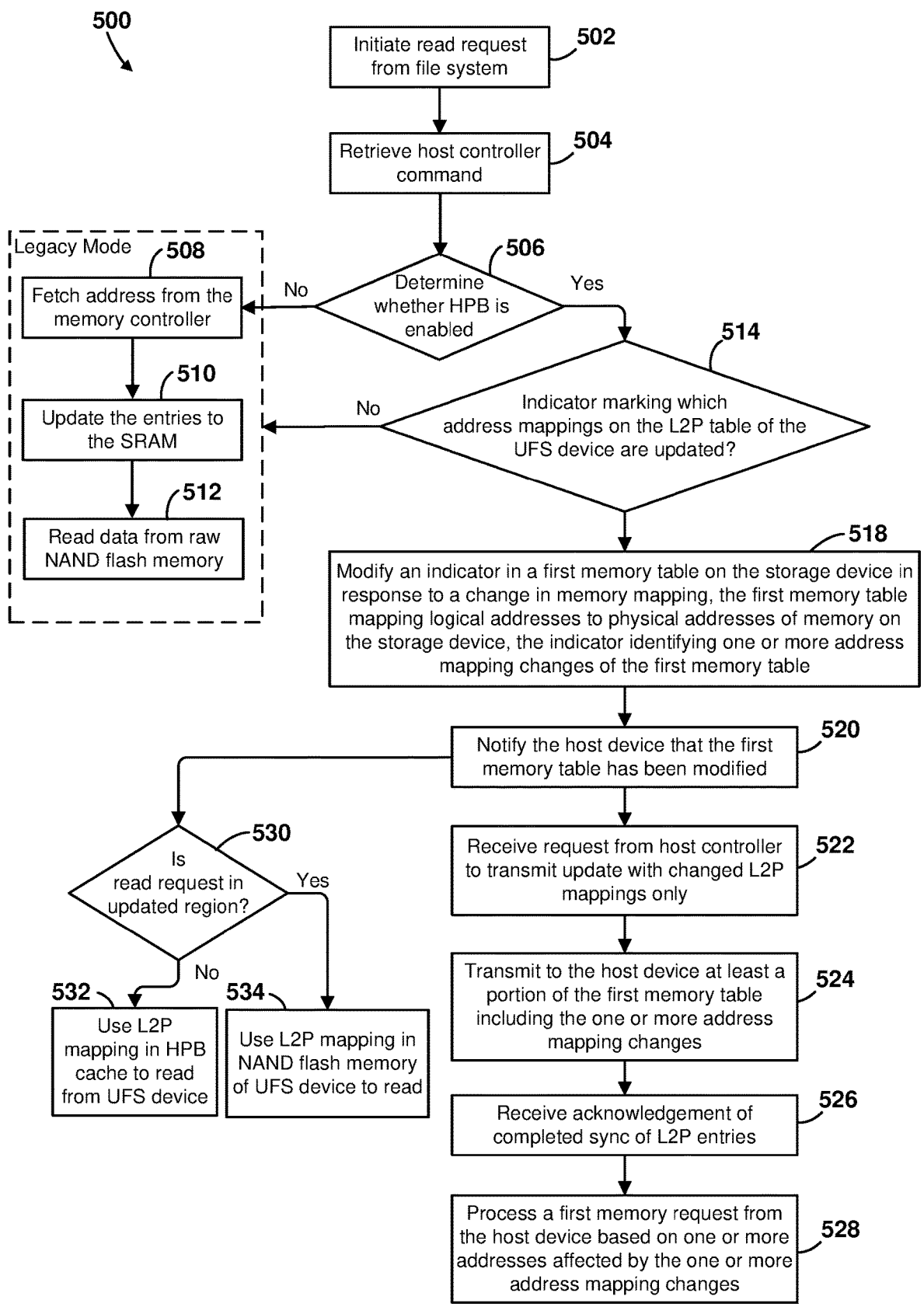
FIG. 5 is a process flow diagram of an example method for HPB mode management and memory table synchronization in accordance with some embodiments.
Figure 6A:
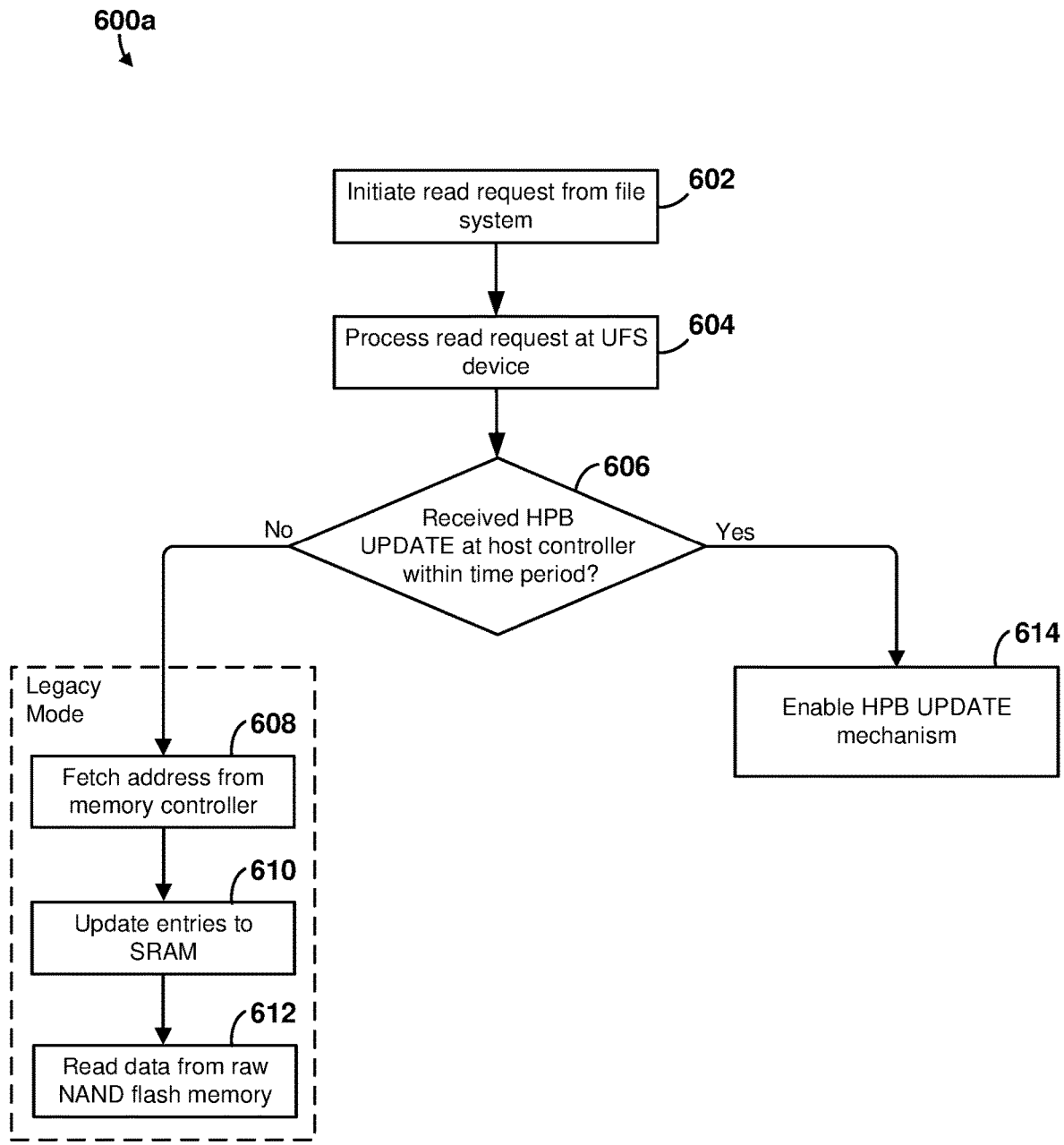
FIGS. 6A-6D are process flow diagrams of an example method for HPB and memory table management in accordance with some embodiments.
Figure 6B:
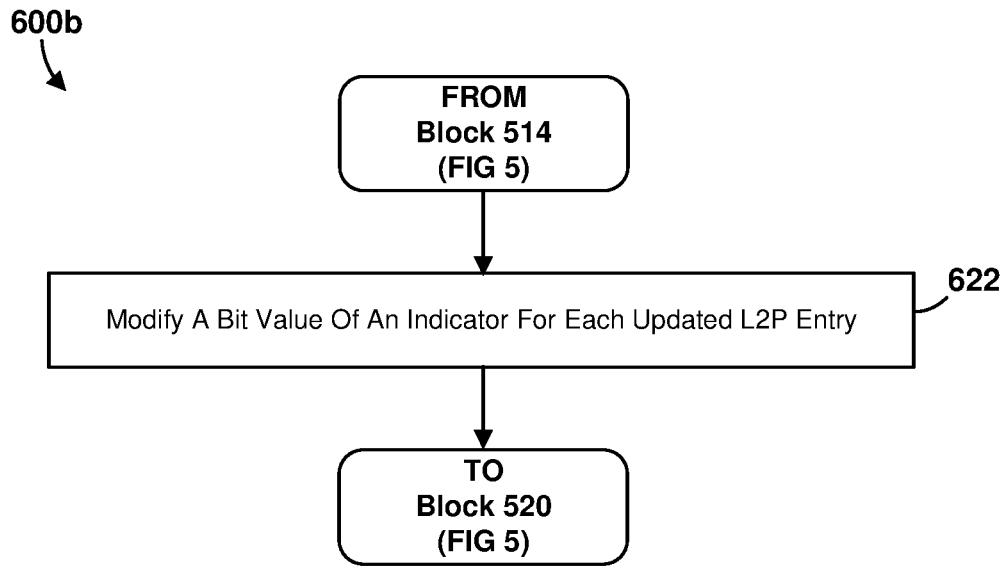
Figure 6C:
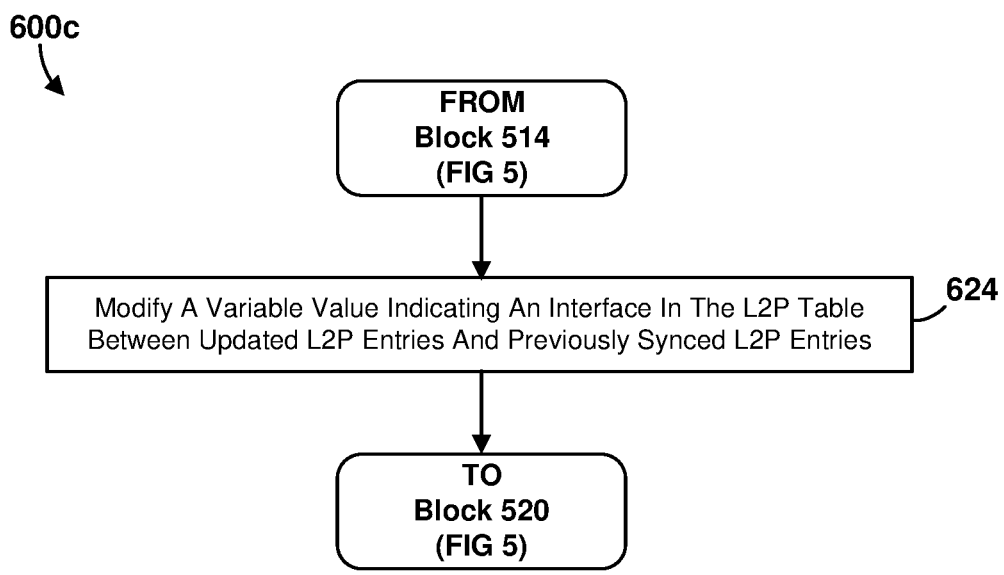
Figure 6D:
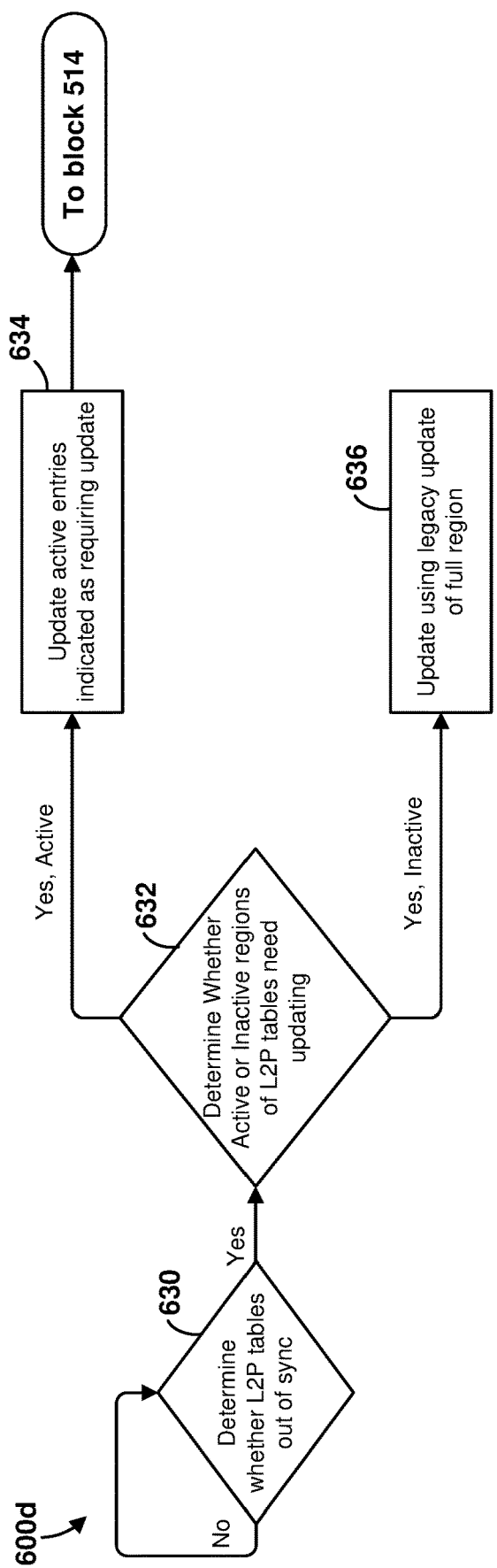

FIGS. 5-6D are process flow diagrams of example methods 500, 600a, 600b, 600c, and 600d in accordance with various embodiments. FIG. 5 is a process flow diagram of an example method 500 that may be performed by a host controller (e.g., by a processor within the host controller) of a computing device for synchronizing L2P tables in accordance with various embodiments. FIGS. 6B-6C are process flow diagrams of example operations 600b-600e that may be performed as part of the method 600a as described for synchronizing L2P tables in accordance with some embodiments. With reference to FIGS. 1-6D, the method 500 and the methods 600a-600e may be performed by a host controller (e.g., 104, 262) of a computing device (e.g., 102, 200, 302) and/or a memory device controller 116. In some embodiments, the host controller (e.g., 104, 262) may include a processor configured to perform the operations by processor-executable instructions stored in a non-transitory processor-readable medium (e.g., 108, 220, 258, 320). In some embodiments, the memory device controller (e.g., 116) or UFS device (e.g., 106, 272) may include a processor configured to perform the operations by processor-executable instructions stored in a non-transitory processor-readable medium (e.g., 108, 220, 258, 320). Means for performing the operations of the methods 500 and 600a-600d may be a processor of the systems 100, 200, and 300 such as the processors 102, 252, 322, and/or the like as described with reference to FIGS. 1-6D.

Referring to FIG. 5, in block 502, the host controller (e.g., 104, 262) of the computing device may (e.g., 102, 200, 302) perform operations including initiating read request from a file system. The read request initiation may include configuring the host controller to receive read requests (e.g., from a component of the SoC 102, 202 or a component or device communicatively connected to the SoC 102, 202 via I/O interface). Means for performing the operations of block 502 may include a host controller (e.g., 104, 262) of a computing device (e.g., 102, 200, 302) and a wireless transceiver (e.g., 266).

In block 504, the host controller (e.g., 104, 262) of the computing device (e.g., 102, 200, 302) may perform operations including retrieving a host controller command. Means for performing the operations of block 504 may include a host controller (e.g., 104, 262) of a computing device (e.g., 102, 200, 302) and a wireless transceiver (e.g., 266).

In determination block 506, the host controller (e.g., 104, 262) of the computing device (e.g., 102, 200, 302) may perform operations including determining whether HPB is enabled. Means for performing the operations of determination block 506 may include a host controller (e.g., 104, 262) of a computing device (e.g., 102, 200, 302) and may include executing the HPB mode module 332.

In response to determining that HPB is not enabled (i.e., determination block 506="No"), the host controller may perform memory read legacy operations in blocks 508, 510, and 512. For example, in block 508, the host controller may fetch an address corresponding to a read request from a memory controller (e.g., 116). In block 510, the host controller may update a legacy memory mapping in the SRAM (e.g., 110) by copying an entire block of active portions of the legacy memory table from the device controller (e.g., 116). In block 512, the host controller, via a device controller (e.g., 116) may read data directly from a NAND flash memory (e.g., 112). Means for performing the operations of blocks 508, 510, and 512 may include a host controller (e.g., 104, 262) of a computing device (e.g., 102, 200, 302) and may include executing the legacy mode module 340.

In response to determining that HPB is enabled (i.e., determination block 606="Yes"), the host controller and/or memory controller may determine whether a second L2P table (e.g., L2P-2) of the UFS device 106 includes indicators marking which address mappings in on the second L2P table are updated in determination block 514. Means for performing the operations of determination block 514 may include a host controller (e.g., 104, 262) of a computing device (e.g., 102, 200, 302) and may include executing the HPB mode module 332.

In response to determining that a L2P table (e.g., L2P-2) stored in an SRAM (e.g., 110) or NAND memory 112 of a UFS device (e.g., 106) communicatively connected to the host controller via a link (e.g., 114) does not contain any mapping update indicators for individual memory mapping entries (e.g., no indicators of whether updated or not) of the L2P table (i.e., determination block 514="No"), the host controller may revert to a legacy mode and perform blocks 508, 510, and 512. In legacy mode, if the first L2P table (e.g., L2P-1) stored in a DRAM (e.g., 108) communicatively connected to the host controller is out of synchronization with a L2P table (e.g., L2P-2) stored in an SRAM (e.g., 110) of a UFS device (e.g., 106), an entire active region of the L2P table may be copied from the UFS device to the host controller.

In response to determining that a L2P table (e.g., L2P-2) stored in an SRAM (e.g., 110) or NAND memory (e.g., 112) of a UFS device (e.g., 106) communicatively connected to the host controller via a link (e.g., 114) does contain indicators for individual memory mapping entries of the L2P table (i.e., determination block 514="Yes"), the host controller and/or memory controller may continue to block 518. In block 518, the memory controller (e.g., 116) or UFS device 106 may modify an indicator in a memory table (e.g., L2P-2) on the storage device in response to a change in memory mapping, the memory table mapping logical addresses to physical addresses of memory on the storage device, the indicator identifying one or more address mapping changes of the memory table. Means for performing the operations of block 518 may include a host controller (e.g., 104, 262) and/or a memory controller (e.g., 116) of a computing device (e.g., 102, 200, 302) and may include executing the operating state notification module 330 and the updated mapping module 338.

In block 520, the memory controller may notify the host controller about an update to the L2P table on the UFS device. In response to determining that the UFS (e.g., 106) is configured to indicate which memory mapping entries require update of the host controller (i.e., determination block 514="Yes"), the host controller and/or memory controller may operate together to update those entries in blocks 520, 522, 524, 526, and 528. The device controller, managing the UFS device memory, may maintain a history of (i) updated L2P table entries, and (ii) the last time the L2P table (e.g., L2P-2) was synchronized with the host controller. Means for performing the operations of block 520 may include a host controller (e.g., 104, 262) and/or a memory controller (e.g., 116) of a computing device (e.g., 102, 200, 302) and may include executing the operating state notification module 330.

In block 522, the memory controller may receive and the host controller may transmit a request to transmit the update with the changed L2P mappings only. In other words, rather than transmitting the entire block of the active region of the L2P table, this request (e.g., HPB_UPDATE_MNT) may only relate to those entries that have been indicated as updated in the L2P table of the memory controller. Means for performing the operations of block 522 may include a host controller (e.g., 104, 262) and/or memory controller (e.g., 116) of a computing device (e.g., 102, 200, 302) and may include executing the updated mapping module 338.

In block 524, the memory controller may transmit to the host controller, and the host controller may receive from the memory controller, the changed L2P mappings from the second L2P table (e.g., L2P-2) of the UFS device. The transmitted mappings may correspond to mapping entries indicated as changed or requiring update. The transmitted mappings may correspond to mapping entries that had been updated since the last synchronization and were unsynchronized at the time of the notification of block 522. The host controller may apply the changed entries from the second L2P table (e.g., L2P-2) to the first L2P table (e.g., L2P-1) of the host controller to synchronize the tables. Such synchronization or merging/replacement of the changed entries in the L2P table of the host controller is described with respect to FIG. 4. Means for performing the operations of block 524 may include a host controller (e.g., 104, 262) and/or memory device controller (e.g., 116) of a computing device (e.g., 102, 200, 302) and may include executing the updated mapping module 338.

In block 526, the host controller (e.g., 104, 262) may transmit and the memory controller (e.g., 116) may receive an acknowledgement of an update to the first L2P table. Based on the acknowledgement, the memory controller (e.g., 116) may reset one or more indicators for one or more memory mapping entries of the second L2P table that were updated and synchronized. Means for performing the operations of block 526 may include a host controller (e.g., 104, 262) and/or memory device controller (e.g., 116) of a computing device (e.g., 102, 200, 302) and may include executing the sync verify module 336.

In block 528, the memory controller may process a memory request from the host device based on one or more addresses affected by the one or more address mapping changes. In other words, after the synchronization, the memory controller may use the physical addresses from the L2P table of the host controller that have been updated and verified. Means for performing the operations of block 526 may include a host controller (e.g., 104, 262) and/or memory device controller (e.g., 116) of a computing device (e.g., 102, 200, 302).

In determination block 530, the host controller (e.g., 104, 262) and/or the memory controller (e.g., 116) of the computing device (e.g., 102, 200, 302) may determine whether the read request relates to an updated entry or updated region. This determination of determination block 530 may be performed while the L2P table is being synchronized as described in blocks 520-526. Since a read request may trigger the notification of block 520, the read request may need to be processed before updating the L2P table. Means for performing the determination of block 530 may include a host controller (e.g., 104, 262) and/or a memory controller (e.g., 116) of a computing device (e.g., 102, 200, 302).

In response to a determination that the read request does not relate to an updated region (i.e., determination block 530="No"), the memory controller may use a L2P mapping in HPB cache to read from UFS device in block 532. In other words, the read request may be executed in the memory controller using the logical block data (address) received from the host controller. Means for performing the operations of block 532 may include a host controller (e.g., 104, 262) and/or a memory controller (e.g., 116) of a computing device (e.g., 102, 200, 302).

In response to a determination that the read request relates to an updated region (i.e., determination block 530="Yes"), the memory controller may perform operations including retrieving at least one modified L2P map entry from the UFS (e.g., 106) in which the at least one modified L2P map entry is stored within the local L2P table (e.g., in NAND memory 112 and/or in L2P-2 of SRAM 110) in block 534. In some embodiments, retrieving the at least one modified L2P map entry from the UFS may further include transmitting, from the host controller to a device controller (e.g., 116) of the UFS, a request message configured to cause the device controller to read logical block data from a NAND flash memory (e.g., NAND memory 112) within the UFS, in which the logical block data is associated with the at least one modified L2P map entry (i.e., in the L2P-2 table of NAND 112), and receiving the logical block data from the device controller. Means for performing the operations of block 534 may include a host controller (e.g., 104, 262) and/or a memory controller (e.g., 116) of a computing device (e.g., 102, 200, 302).

FIG. 6A is a process flow diagram of an example method 600a that may be performed by a host controller of a computing device for synchronizing L2P tables in accordance with various embodiments. FIGS. 6B-6D are process flow diagrams of example operations 600b-600d that may be performed as part of the method 600a as described for synchronizing L2P tables in accordance with some embodiments. With reference to FIGS. 1-6D, the method 600a and the operations 600b-600d may be performed by a host controller (e.g., 104, 262) and/or a memory controller (e.g., 116) of a computing device (e.g., 102, 200, 302). In some embodiments, the host controller (e.g., 104, 262) and/or a memory controller (e.g., 116) may be configured to perform the operations by processor-executable instructions stored in a non-transitory processor-readable medium (e.g., 108, 220, 258, 320). Means for performing each of the operations of the method 600a and the operations 600b-600e may be a processor of the systems 100, 200, and 300 such as the processors 102, 252, 322, and/or the like as described with reference to FIGS. 1-6D.

Referring to FIG. 6A and method 600a, in block 602, the host controller (e.g., 104, 262) of the computing device may (e.g., 102, 200, 302) perform operations including initiating read request from a file system. The read request initiation may include configuring the host controller to receive read requests (e.g., from a component of the SoC 102, 202 or a component or device communicatively connected to the SoC 102, 202 via I/O interface). Means for performing the operations of block 602 may include a host controller (e.g., 104, 262) of a computing device (e.g., 102, 200, 302).

In block 604, the host controller may process the read request at the UFS device (e.g., 106) which may include transmitting a read request with a logical block address to the memory controller (e.g., 116). Means for performing the operations of block 604 may include a host controller (e.g., 104, 262) of a computing device (e.g., 102, 200, 302).

In determination block 606, after receiving and processing one or more read requests, the host controller may determine whether an HPB UPDATE notification has been received within a time period. The HPB UPDATE notification may be an exception event control or an interrupt from the UFS device that indicates updates are available for synchronization. Means for performing the operations of block 604 may include a host controller (e.g., 104, 262) of a computing device (e.g., 102, 200, 302).

In response to determining that an HPB UPDATE notification (e.g., interrupt or exception) has not been received within a time period (i.e., determination block 606="No"), the host controller may perform memory read legacy operations in blocks 608, 610, and 612. In block 608, the host controller may fetch an address corresponding to a read request from a memory controller (e.g., of the SoC 102, 202). In block 610, the host controller may update the address mapping table entries in the SRAM (e.g., SRAM 110). In block 612, the host controller, via a memory device controller (e.g., device controller 116) may read raw data from a NAND flash memory (e.g., NAND memory 112). This legacy mode is described further regarding FIG. 5. Means for performing the operations of blocks 608, 610, and 612 may include a host controller (e.g., 104, 262) of a computing device (e.g., 102, 200, 302).

In response to determining that an HPB UPDATE notification has been received within a time period (i.e., determination block 606="Yes"), the host controller may enable an HPB UPDATE mechanism of the host controller and the memory device controller in block 614. The HPB UPDATE mechanism may include the capability for the host controller to transmit a request for updated L2P table entries. The HPB UPDATE mechanism may include the capability for the memory controller to transmit a notification that updated L2P table entries are available (i.e., sync is needed) and to transmit the updated L2P entries to the host controller. The host controller and the memory device controller may continue after block 614 to proceed through blocks 520-528. Means for performing the operations of block 614 may include a host controller (e.g., 104, 262) of a computing device (e.g., 102, 200, 302).

Referring to FIG. 6B and method 600b, the memory controller (e.g., 116) may perform operations of block 622 as part of block 518 in which modification of an indicator is used to identify one or more L2P mapping entries that need to be synchronized. The operations of block 622 may be performed after the operations in block 514 of the method 500 and may be followed by the operations in block 520 of the method 500 as described. In block 622 the memory controller (e.g., 116) modify a bit value of an indicator for each updated L2P entry. In other words, the indicator used by the memory controller to identify the L2P entries that have been updated on the UFS device (e.g., 106) may be a bit value that is assigned to each L2P entry (e.g., 0=not updated; 1=updated). Means for performing the operations of block 622 may include a memory controller (e.g., 116) of a computing device (e.g., 106, 200, 302).

Referring to FIG. 6C and the method 600c, the memory controller (e.g., 116) may perform the operations of block 624 as part of the operations of block 518 in which modification of an indicator is used to identify one or more L2P mapping entries that need to be synchronized. In block 624, the memory controller (e.g., 116) may modify a variable value indicating an interface in the L2P table between updated L2P entries and previously synced L2P entries. For example, a first pointer may record (or indicate) a starting position in the L2P table where updated entries begin and a second pointer may record an ending position (e.g., an interface) of the updated entries in the L2P table where non-updated entries begin. If the updated entries are stored at the top (first positions) in the table, the first pointer may be optional. The operations in block 624 may be performed after the operations of block 514 of the method 500 and may be followed by the operations of block 520 of the method 500 as described. Means for performing the operations of block 624 may include a memory controller (e.g., 116) of a computing device (e.g., 106, 200, 302).

Referring to FIG. 6D and method 600d, the host controller may determine whether L2P address mapping tables are synchronized in determination block 630. The memory device controller (e.g., device controller 116) may determine whether an L2P address mapping table (e.g., L2P-1) stored in a DRAM (e.g., DRAM 108) communicatively connected to the host controller and an L2P address mapping table (e.g., L2P-2) stored in NAND memory (e.g., NAND memory 112) of a UFS device (e.g., UFS device 102) and communicatively connected to the memory device controller are synchronized or out of sync. Means for performing the determination of block 630 may include a memory controller (e.g., 116) of a computing device (e.g., 106, 200, 302).

In response to determining that the L2P address mapping tables are synchronized and are not out of sync (i.e., determination block 630="No"), the memory controller and/or the host controller may continue with other processes and may repeat the operations in determination block 630 until an update to an L2P table of the memory controller makes the L2P address mapping tables out of sync (i.e., determination block 630="Yes").

In response to determining that the L2P address mapping tables are not synchronized and thus are out of sync (i.e., determination block 630="Yes"), the memory controller may determine whether active or inactive regions of L2P tables need updating in determination block 632. Means for performing the determinations of block 630 and block 632 may include a memory controller (e.g., 116) of a computing device (e.g., 106, 200, 302).

In response to determining that inactive regions of the L2P address mapping tables require updating (i.e., determination block 632="Yes, inactive"), the memory controller and/or the host controller may revert to a legacy mode to synchronize the L2P tables in block 636, which may include an update of the full region (i.e., active and inactive). For example, if the UFS device (e.g., 106) is coming out of hibernation, changes to inactive regions of the L2P tables may be required. Means for performing the operations of block 636 may include a memory controller (e.g., 116) and/or a host controller (e.g., 104) of a computing device (e.g., 106, 200, 302).

In response to determining that active regions of the L2P address mapping tables require updating (i.e., determination block 632="Yes, active"), the memory controller and/or the host controller may update one or more active entries that are indicated as requiring update (e.g., as described in methods 600b and 600c) in block 634. The memory controller may then perform the operations of block 514 of the method 500 in which a determination may be made whether the host controller and/or the memory controller support indicators and synchronizing for individual memory mapping entries that have been changed. Means for performing the operations of block 634 may include a memory controller (e.g., 116) and/or a host controller (e.g., 104) of a computing device (e.g., 106, 200, 302).

Figure 7:
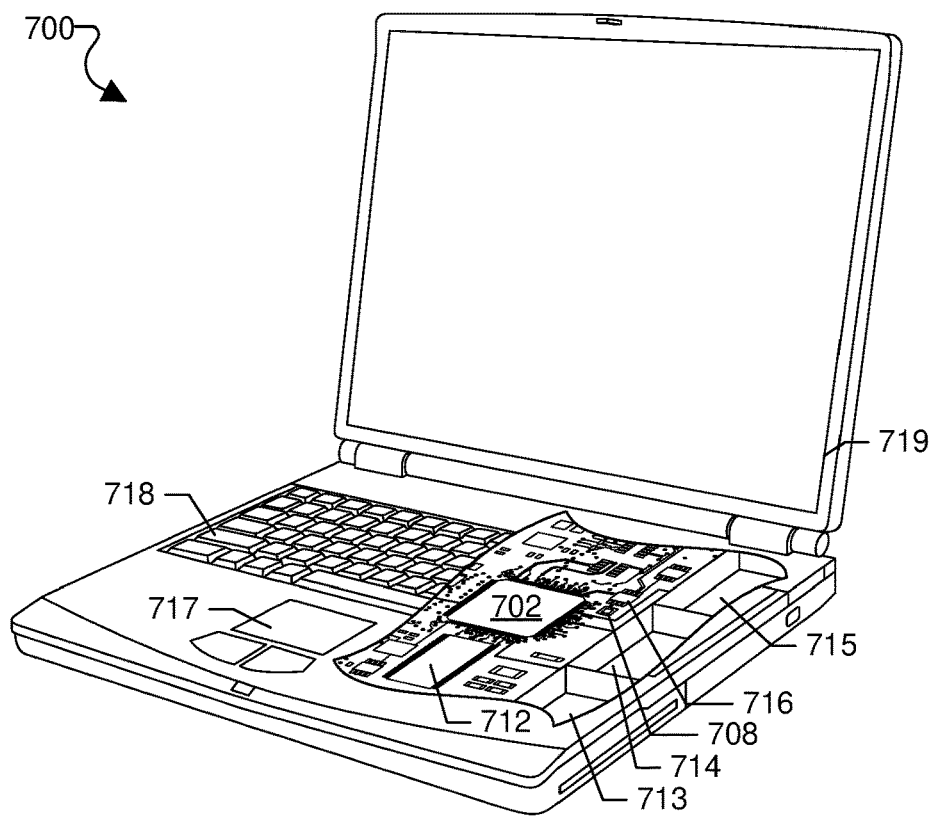
FIG. 7 is a component block diagram illustrating an example computing device suitable for use with the various embodiments.

The various embodiments (including, but not limited to, embodiments described with reference to FIGS. 1-6D) may be implemented in a wide variety of computing systems, which may include a laptop computer 700 (e.g., computing device 100, 200, 320), an example of which is illustrated in FIG. 7. With reference to FIGS. 1-7, a laptop computer may include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a compact disc (CD) drive 715 coupled to the processor 702. The laptop computer 700 may include a touchpad 717, a keyboard 718, and a display 719 all coupled to the processor 702. Other configurations of the computing device may include a computer mouse or trackball coupled to the processor (e.g., via a USB input) as are well known, which may also be used in conjunction with the various embodiments.

Figure 8:
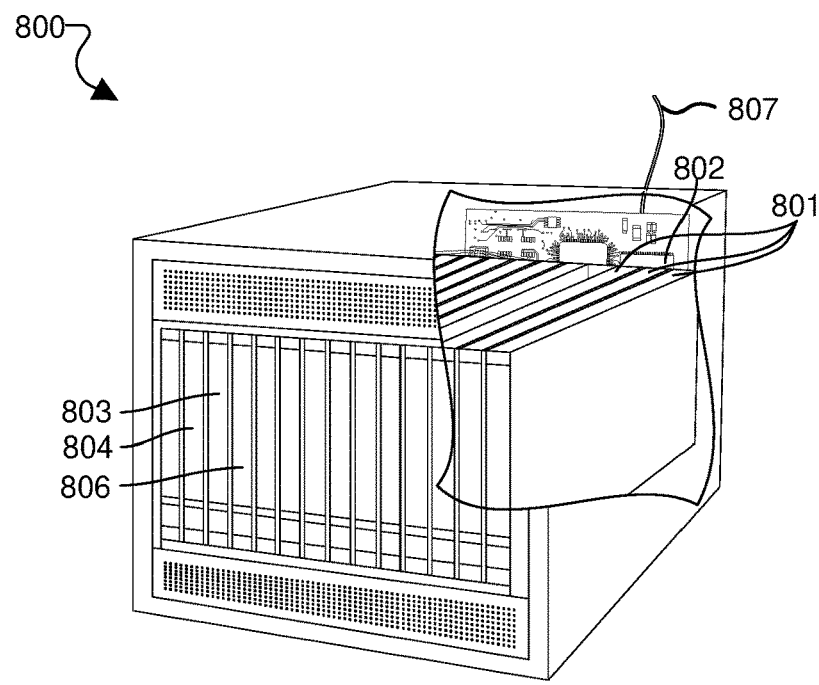
FIG. 8 is a component block diagram illustrating an example server suitable for use with the various embodiments.

FIG. 8 is a component block diagram of a computing device 800, such as a server, suitable for use with various embodiments. Such computing devices may include at least the components illustrated in FIG. 8. With reference to FIGS. 1-8, the computing device 800 (e.g., computing device 100, 200, 320) may include a processor 801 coupled to volatile memory 802 and a large capacity nonvolatile memory, such as a disk drive 803.

The computing device 800 may also include a peripheral memory access device such as a floppy disc drive, compact disc (CD) or digital video disc (DVD) drive 806 coupled to the processor 801. The computing device 800 may also include network access ports 804 (or interfaces) coupled to the processor 801 for establishing data connections with a network, such as the Internet and/or a local area network coupled to other system computers and servers.

The computing device 800 may include one or more antennas 807 for sending and receiving electromagnetic radiation that may be connected to a wireless communication link. The computing device 800 may include additional access ports, such as USB, Firewire, Thunderbolt, and the like for coupling to peripherals, external memory, or other devices.

Figure 9:
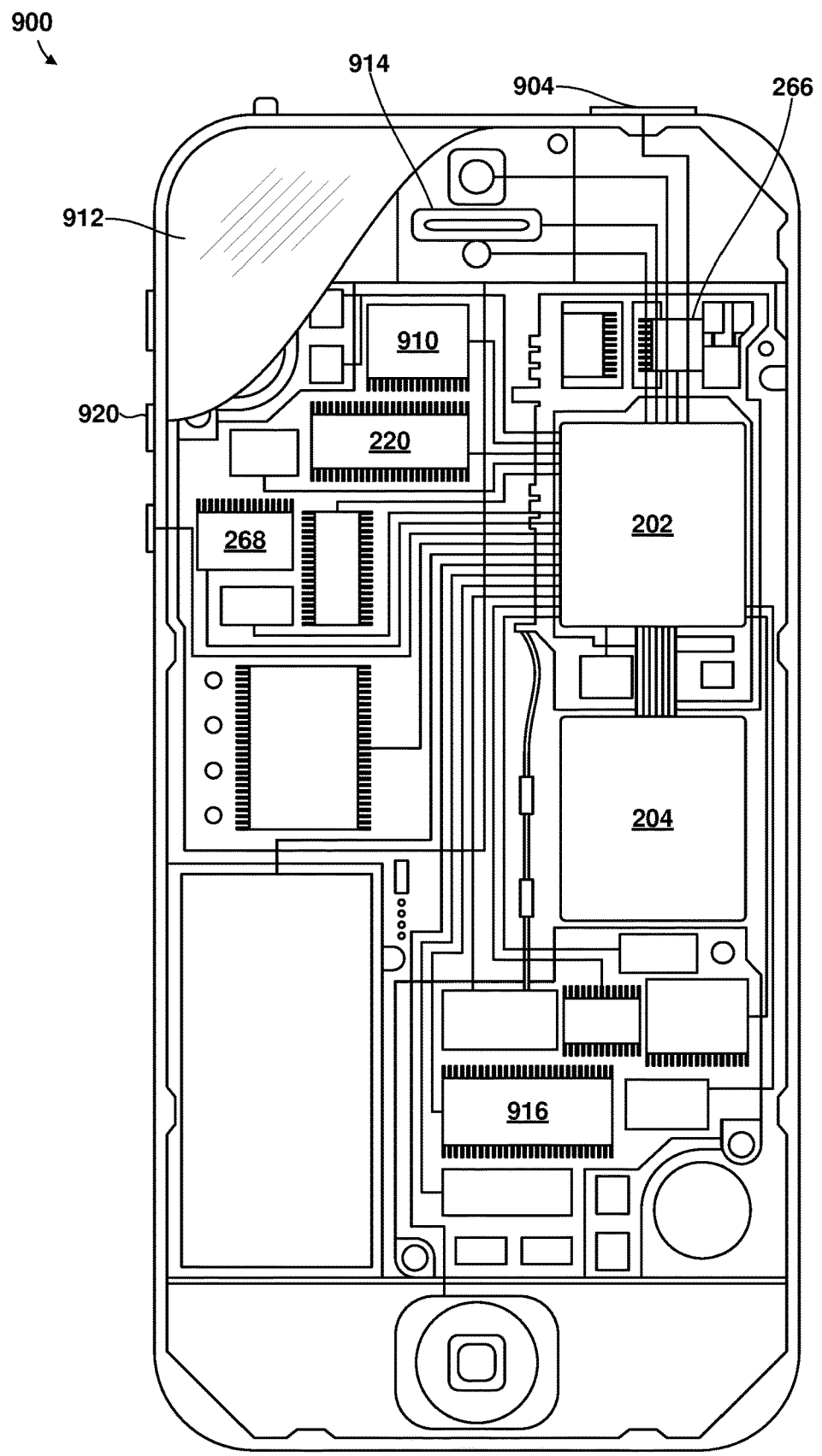
FIG. 9 is a component block diagram illustrating an example wireless communication device suitable for use with the various embodiments.

FIG. 9 is a component block diagram of a computing device 900 suitable for use with various embodiments. With reference to FIGS. 1-9, various embodiments may be implemented on a variety of computing devices 900 (e.g., computing device 100, 200, 320), an example of which is illustrated in FIG. 9 in the form of a smartphone. The computing device 900 may include a first SoC 202 (e.g., a SoC-CPU) coupled to a second SoC 204 (e.g., a 5G capable SoC). The first and second SoCs 202, 204 may be coupled to internal memory 916, a display 912, and to a speaker 914. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The computing device 900 may include an antenna 904 for sending and receiving electromagnetic radiation that may be connected to a wireless transceiver 266 coupled to one or more processors in the first and/or second SoCs 202, 204. The computing device 900 may also include menu selection buttons or rocker switches 920 for receiving user inputs.

The computing device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 910 may include a digital signal processor (DSP) circuit (not shown separately).

The processors of the computer 700, the computing device 800, and the computing device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in memory 220, 916 before they are accessed and loaded into the processor. The processors may include internal memory sufficient to store the application software instructions.

Implementation examples are described in the following paragraphs. While some of the following implementation examples are described in terms of example methods that may be performed in a computing device by a host controller, further example implementations may include: a computing device including a host controller configured to perform the methods of the following implementation examples; a computing device including means for performing functions of the following implementation examples, a host controller suitable for use in a computing device, in which the host controller includes a processor configured to perform the methods of the following implementation examples; and a non-transitory, processor-readable memory having stored thereon processor-executable instructions configured to cause a host controller in a computing device configured to perform the methods of the following implementation examples.

Example 1. A method performed in a storage device for synchronizing memory tables between the storage device and a host device, including: modifying an indicator in a first memory table on the storage device in response to a change in a memory mapping, the first memory table mapping logical addresses to physical addresses of memory on the storage device, the indicator identifying one or more address mapping changes of the first memory table; notifying the host device that the first memory table has been modified; transmitting to the host device at least a portion of the first memory table including the one or more address mapping changes; and processing, by the storage device, a first memory request from the host device based on one or more addresses affected by the one or more address mapping changes.

Example 2. The method of example 1, in which the portion of the first memory table transmitted to the host device corresponds to the one or more address mapping changes.

Example 3. The method of either of example 1 or 2, further including receiving, by the storage device, a request for the one or more address mapping changes Example 4. The method of any of examples 1-3, in which, the first memory request includes a physical address updated based on the one or more address mapping changes.

Example 5. The method of any of examples 1-4, in which, the indicator is a bit value assigned to each memory mapping in the first memory table, and in which, the bit value is changed when the corresponding memory mapping is changed.

Example 6. The method of any of examples 1-4, in which, the indicator is a value that indicates a position in the first memory table corresponding to an interface between a synchronized portion of the first memory table and an unsynchronized portion of the first memory table corresponding to the one or more mapping address changes.

Example 7. The method of any of examples 1-6, further including resetting the indicator upon receipt of an acknowledgement from the host device that the portion of the first memory table has been received.

Example 8. The method of any of examples 1-7, further including transmitting a notification to the host device upon modifying the indicator in the first memory table on the storage device.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), Long Term Evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed in a storage device for synchronizing memory tables between the storage device and a host device, comprising:
   modifying an indicator in a first memory table on the storage device in response to a change in a memory mapping, the first memory table mapping logical addresses to physical addresses of memory on the storage device, the indicator identifying one or more address mapping changes of the first memory table, wherein the indicator is a value that indicates a position in the first memory table corresponding to an interface between a synchronized portion of the first memory table and an unsynchronized portion of the first memory table corresponding to the one or more mapping address changes;
   notifying the host device that the first memory table has been modified;
   transmitting to the host device at least a portion of the first memory table including the one or more address mapping changes; and
   processing, by the storage device, a first memory request from the host device based on one or more addresses affected by the one or more address mapping changes.

2. The method of claim 1, wherein the portion of the first memory table transmitted to the host device corresponds to the one or more address mapping changes.

3. The method of claim 1, further comprising receiving, by the storage device, a request for the one or more address mapping changes.

4. The method of claim 1, wherein the first memory request includes a physical address updated based on the one or more address mapping changes.

5. The method of claim 1, wherein the indicator is a bit value assigned to each memory mapping in the first memory table, wherein the bit value is changed when the corresponding memory mapping is changed.

6. The method of claim 1, further comprising resetting the indicator upon receipt of an acknowledgement from the host device that the portion of the first memory table has been received.

7. The method of claim 1, further comprising transmitting a notification to the host device upon modifying the indicator in the first memory table on the storage device.

8. A flash storage device, comprising:
   a plurality of logical units of memory;
   a processor coupled to the memory and configured to:
      modify an indicator in a first memory table on the storage device in response to a change in a memory mapping, the first memory table mapping logical addresses to physical addresses of memory on the storage device, the indicator identifying one or more address mapping changes of the first memory table, wherein the indicator is a value that indicates a position in the first memory table corresponding to an interface between a synchronized portion of the first memory table and an unsynchronized portion of the first memory table corresponding to the one or more mapping address changes;
      notify a host device that the first memory table has been modified;
      transmit to the host device at least a portion of the first memory table including the one or more address mapping changes; and
      process a first memory request from the host device based on one or more addresses affected by the one or more address mapping changes.

9. The flash storage device of claim 8, wherein the portion of the first memory table transmitted to the host device corresponds to the one or more address mapping changes.

10. The flash storage device of claim 8, wherein the processor is further configured to receive a request for the one or more address mapping changes.

11. The flash storage device of claim 8, wherein the first memory request includes a physical address updated based on the one or more address mapping changes.

12. The flash storage device of claim 8, wherein the indicator is a bit value assigned to each memory mapping in the first memory table, and wherein the bit value is changed when the corresponding memory mapping is changed.

13. The flash storage device of claim 8, wherein the processor is further configured to resetting the indicator upon receipt of an acknowledgement from the host device that the portion of the first memory table has been received.

14. The flash storage device of claim 8, wherein the processor is further configured with processor-executable instructions to transmitting a notification to the host device upon modifying the indicator in the first memory table on the storage device.

15. A flash storage device, comprising:
   means for modifying an indicator in a first memory table on the storage device in response to a change in a memory mapping, the first memory table mapping logical addresses to physical addresses of memory on the storage device, the indicator identifying one or more address mapping changes of the first memory table, wherein the indicator is a value that indicates a position in the first memory table corresponding to an interface between a synchronized portion of the first memory table and an unsynchronized portion of the first memory table corresponding to the one or more mapping address changes;
   means for notifying a host device that the first memory table has been modified;
   means for transmitting to the host device at least a portion of the first memory table including the one or more address mapping changes; and
   means for processing a first memory request from the host device based on one or more addresses affected by the one or more address mapping changes.

16. The flash storage device of claim 15, wherein the portion of the first memory table transmitted to the host device corresponds to the one or more address mapping changes.

17. The flash storage device of claim 15, further comprising means for receiving a request for the one or more address mapping changes.

18. The flash storage device of claim 15, wherein the first memory request includes a physical address updated based on the one or more address mapping changes.

19. The flash storage device of claim 15, wherein the indicator is a bit value assigned to each memory mapping in the first memory table, wherein the bit value is changed when the corresponding memory mapping is changed.

20. The flash storage device of claim 15, further comprising means for resetting the indicator upon receipt of an acknowledgement from the host device that the portion of the first memory table has been received.

21. The flash storage device of claim 15, further comprising means for transmitting a notification to the host device upon modifying the indicator in the first memory table on the storage device.

22. A computing device, comprising:
a host device; and
a flash storage device communicationally coupled to the host device, the flash storage device comprising:
 a plurality of logical units of memory; and
 a processor coupled to the memory and configured to:
  modify an indicator in a first memory table on the storage device in response to a change in a memory mapping, the first memory table mapping logical addresses to physical addresses of memory on the storage device, the indicator identifying one or more address mapping changes of the first memory table, wherein the indicator is a value that indicates a position in the first memory table corresponding to an interface between a synchronized portion of the first memory table and an unsynchronized portion of the first memory table corresponding to the one or more mapping address changes;
  notify the host device that the first memory table has been modified;
  transmit to the host device at least a portion of the first memory table including the one or more address mapping changes; and
  process a first memory request from the host device based on one or more addresses affected by the one or more address mapping changes.

23. The computing device of claim 22, wherein the portion of the first memory table transmitted to the host device corresponds to the one or more address mapping changes.

24. The computing device of claim 22, wherein the processor is further configured to receive a request for the one or more address mapping changes.

25. The computing device of claim 22, wherein the first memory request includes a physical address updated based on the one or more address mapping changes.

26. The computing device of claim 22, wherein the indicator is a bit value assigned to each memory mapping in the first memory table, and wherein the bit value is changed when the corresponding memory mapping is changed.

* * * * *